(12) United States Patent
DeBoni

(10) Patent No.: US 6,889,128 B2
(45) Date of Patent: May 3, 2005

(54) SYSTEM AND METHOD FOR CONTROLLING VEHICLE SUSPENSION COMPONENTS AND VEHICLE OCCUPANT PROTECTION DEVICES

(75) Inventor: Albert W. DeBoni, Shelby Township, MI (US)

(73) Assignee: TRW Inc., Lyndhurst, OH (US)

( * ) Notice: Subject to any disclaimer, the term of this patent is extended or adjusted under 35 U.S.C. 154(b) by 301 days.

(21) Appl. No.: 09/839,911

(22) Filed: Apr. 20, 2001

(65) Prior Publication Data

US 2002/0156561 A1 Oct. 24, 2002

(51) Int. Cl.[7] .............................................. G06F 7/00
(52) U.S. Cl. ........................... 701/36; 701/37; 701/45
(58) Field of Search ................................................ 701/36

(56) References Cited

U.S. PATENT DOCUMENTS

| | | | | |
|---|---|---|---|---|
| 5,233,871 A | * | 8/1993 | Schwarz et al. ............... 73/493 |
| 5,372,411 A | | 12/1994 | Gerstenmaier et al. ...... 303/100 |
| 5,540,298 A | * | 7/1996 | Yoshioka et al. ............ 180/169 |
| 5,658,011 A | * | 8/1997 | Byon .......................... 280/735 |
| 5,762,366 A | * | 6/1998 | Faye ........................... 280/735 |
| 5,808,197 A | * | 9/1998 | Dao .......................... 73/514.09 |
| 5,825,098 A | | 10/1998 | Darby et al. ................ 307/10.1 |
| 5,835,873 A | * | 11/1998 | Darby et al. ................... 701/45 |
| 5,890,084 A | * | 3/1999 | Halasz et al. .................. 701/45 |
| 6,082,715 A | * | 7/2000 | Vandermolen ............... 267/131 |
| 6,149,190 A | * | 11/2000 | Galvin et al. ................ 280/735 |
| 6,199,874 B1 | * | 3/2001 | Galvin et al. ............. 280/5.514 |
| 6,550,810 B1 | * | 4/2003 | Bauer et al. ................. 280/803 |

FOREIGN PATENT DOCUMENTS

GB          2292126 A  *  2/1996   ........... B60R/21/00

* cited by examiner

Primary Examiner—Thomas G. Black
Assistant Examiner—Christine M. Behncke
(74) Attorney, Agent, or Firm—Tarolli, Sundheim, Covell & Tummino L.L.P.

(57) ABSTRACT

A system (10) for controlling an active vehicle suspension component (12) and a vehicle occupant protection device (14) includes a controller (70). The controller (70) is operatively connected to the active suspension component (12) of a vehicle (50) and the vehicle occupant protection device (14) of the vehicle. The system (10) also includes at least one sensor (72, 74, 76) for sensing acceleration of the vehicle (50) along at least one axis of the vehicle. The at least one sensor (72, 74, 76) is operatively connected to the controller (70) to provide at least one signal indicative of vehicle acceleration along the at least one axis to the controller. The controller (70) is operative to control the active suspension component (12) in response to the at least one signal. The controller (70) is also operative to control the vehicle occupant protection device (14) in response to the at least one signal.

18 Claims, 4 Drawing Sheets

SYSTEM AND METHOD FOR CONTROLLING VEHICLE SUSPENSION COMPONENTS AND VEHICLE OCCUPANT PROTECTION DEVICES

TECHNICAL FIELD

The present invention relates to a system for controlling vehicle suspension components and vehicle occupant protection devices. More particularly, the present invention relates to a system and method whereby controlling vehicle suspension components and vehicle occupant protection devices are controlled by a single common controller that receives data from common sensors.

BACKGROUND OF THE INVENTION

It is known to provide a vehicle with a vehicle occupant protection device in order to help protect a vehicle occupant in the event of a vehicle impact or rollover event. The known vehicle occupant protection devices include devices such as seatbelt tensioners/retractors and inflatable devices such as frontal air bags, side air bags, side curtains, and inflatable knee bolsters. The known vehicle occupant protection devices are actuated by crash sensors. The crash sensors typically include accelerometers for sensing acceleration indicative of a vehicle impact or rollover event.

It is also known to provide a vehicle with an active suspension system to counteract vehicle roll and/or pitch during operation of the vehicle. The known active suspension systems include actuators that apply forces to the vehicle in a direction opposite the roll and/or pitch. The actuators are typically incorporated in suspension components such as shock absorbers, struts and stabilizer bars. The actuators are actuated based at least partially on signals provided by vehicle roll and/or pitch sensors. The roll/pitch sensors typically include accelerometers for sensing vehicle acceleration indicative of vehicle roll and/or pitch.

SUMMARY OF THE INVENTION

In accordance with the present invention, a system for controlling active vehicle suspension components and vehicle occupant protection devices includes a controller. The controller is operatively connected to the active suspension components of a vehicle and the vehicle occupant protection devices of the vehicle. The system also includes at least one sensor for sensing acceleration of the vehicle along at least one axis of the vehicle. The at least one sensor is operatively connected to the controller to provide at least one signal indicative of vehicle acceleration along the at least one axis to the controller. The controller is operative to control the active suspension components in response to the at least one signal. The controller is also operative to control the vehicle occupant protection devices in response to the at least one signal.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXAMPLE EMBODIMENT

Figure 1:
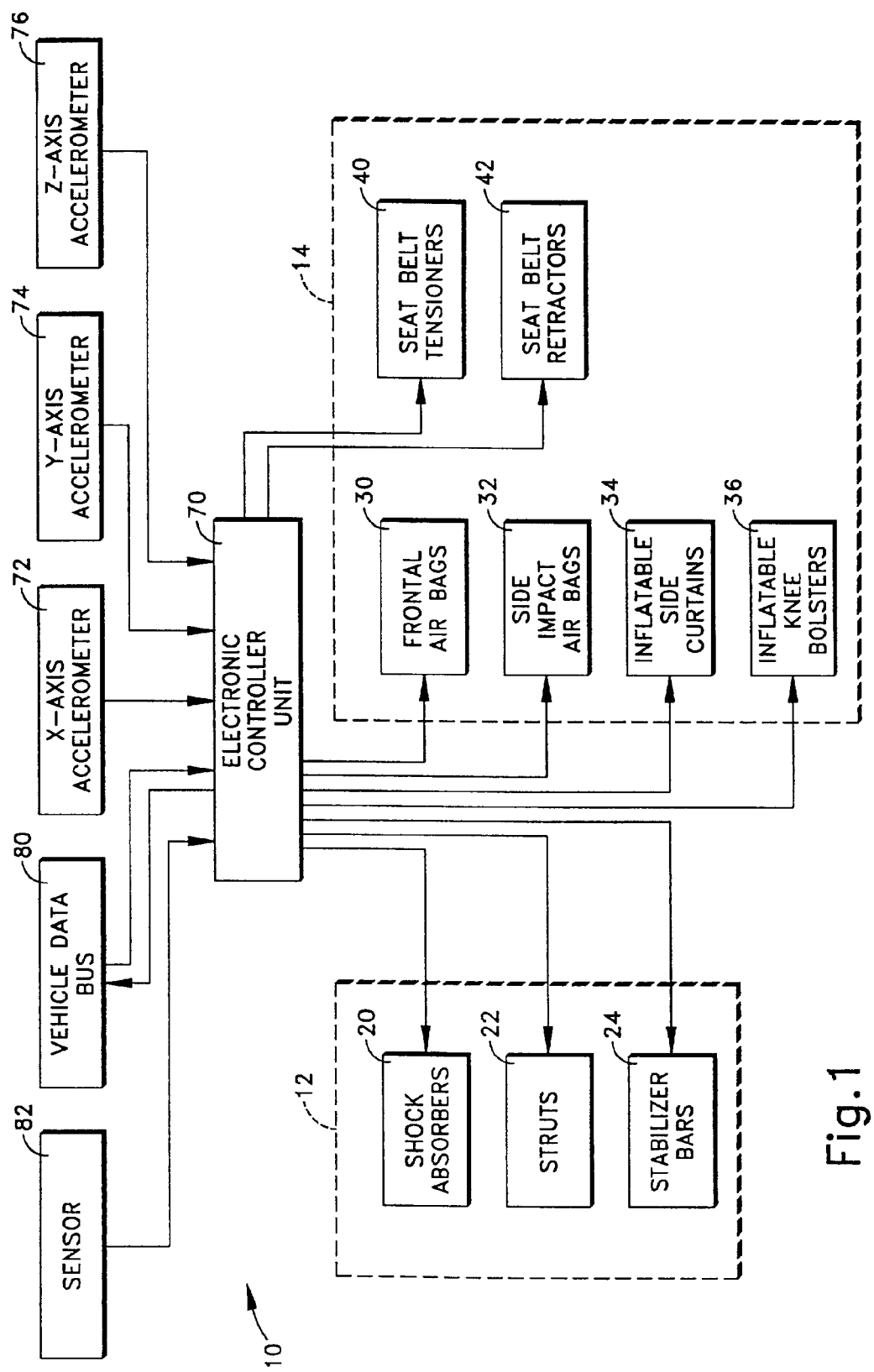
FIG. 1 is a schematic illustration of a system for controlling vehicle suspension components and vehicle occupant protection devices in accordance with an example embodiment of the present invention.

In accordance with an example embodiment of the present invention, FIG. 1 illustrates a system 10 a controlling vehicle suspension components 12 and vehicle occupant protection devices 14. The vehicle suspension components 12 include active suspension components that include actuators for applying forces that oppose vehicle roll and/or pitch. The active suspension components 12 may include devices such as shock absorbers 20, struts 22 and stabilizer bars 24.

The vehicle occupant protection devices 14 may include inflatable frontal restraints such as front impact air bags 30 and inflatable knee bolsters 36. The vehicle occupant protection devices 14 may also include inflatable side impact restraints such as side impact air bags 32, inflatable side curtains 34. The vehicle occupant protection devices 14 seat belt restraints, such as seat belt pre-tensioners 40 or retractors 42. It will be appreciated that the vehicle occupant protection devices 14 may include other inflatable and non-inflatable protection devices.

Figure 2:
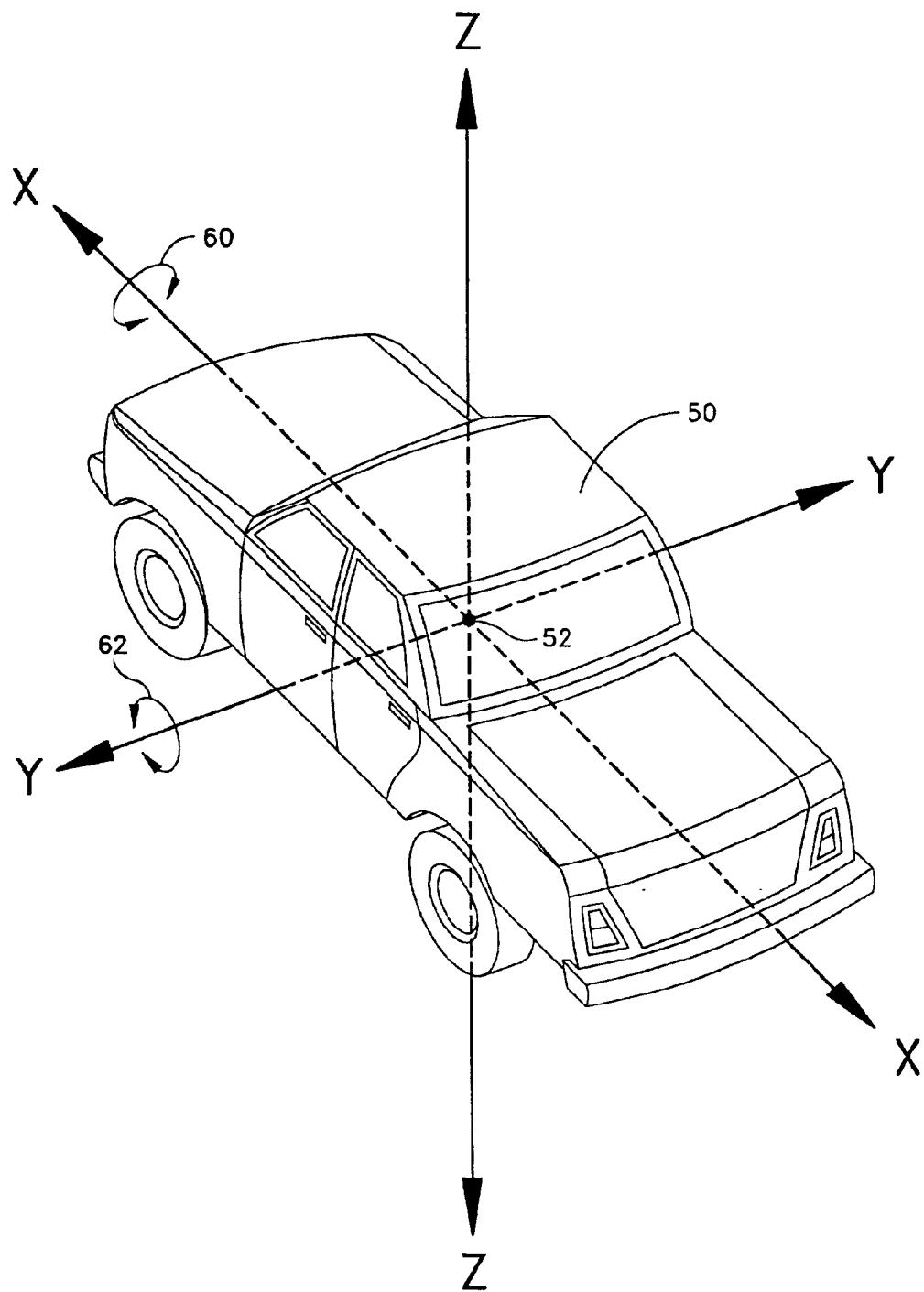
FIG. 2 is a perspective view of a vehicle in which the system of FIG. 1 is incorporated.

Referring to FIG. 2, a vehicle 50 in which the system 10 (FIG. 1) is incorporated has an x-axis (FIG. 2), a y-axis, and a z-axis. The x-axis extends generally longitudinally along the vehicle 50. The y-axis extends generally laterally across the vehicle 50, perpendicular to the x-axis. The z-axis extends generally vertically through the vehicle 50, perpendicular to the x-axis and the y-axis. The x-axis, y-axis, and z-axis intersect at a center of gravity 52 of the vehicle 50.

During operation of the vehicle 50, it will be appreciated that the vehicle will experience acceleration along the x-axis, Y-axis and z-axis in a variety of vehicle events. Such events include vehicle roll events, vehicle pitch events, front end vehicle impacts, rear end vehicle impacts, vehicle side impacts, and vehicle rollover events.

Vehicle roll results from lateral acceleration of the vehicle 50 during events such as cornering, swerving, and lane-changing. During a vehicle roll event, the vehicle 50 tends to rotate or pivot generally about the x-axis. Vehicle roll is indicated generally by the curved arrow labeled 60 in FIG. 2. During a vehicle roll event, the vehicle 50 will experience acceleration along the y-axis of the vehicle. The vehicle 50 may also experience acceleration along the z-axis during a vehicle roll event.

Vehicle pitch results from longitudinal acceleration of the vehicle 50 during events such as braking or acceleration. During a vehicle pitch event, the vehicle 50 tends to rotate or pivot generally about the y-axis. Vehicle roll is indicated generally by the curved arrow labeled 60 in FIG. 2. During a vehicle pitch event, the vehicle 50 will experience acceleration along the x-axis of the vehicle. The vehicle 50 may also experience acceleration along the z-axis during a vehicle pitch event.

During a front-end or rear-end vehicle impact, the vehicle 50 will experience acceleration along the x-axis of the vehicle. During a vehicle side impact, the vehicle 50 will experience acceleration along the y-axis of the vehicle. During a vehicle rollover event, the vehicle 50 will experience acceleration along the z-axis.

The system 10 (FIG. 1) includes an electronic controller unit, hereinafter referred to as an ECU 70, for controlling actuation of the active suspension components 12 and the vehicle occupant protection devices 14. The ECU 70 is operatively connected to each of the active suspension components 12 and the vehicle occupant protection devices 14 and is operable to control each of the components and/or devices, individually or collectively, based on sensed vehicle conditions. The ECU 70 is a single centralized unit and is the only device operable to control the active suspension components 12 and the vehicle occupant protection devices 14 based on sensed vehicle conditions. The system 10 is free from any other controllers or other similar devices operable to actuate or otherwise control the active suspension components 12 or the vehicle occupant protection devices 14 based on sensed vehicle conditions. Other vehicle components may supply data to or receive data from the ECU 70, but the ECU 70 is the only device in the system 10 operable to command actuation of the active suspension components 12 and the vehicle occupant protection devices 14.

The system 10 includes an x-axis accelerometer 72 for sensing acceleration of the vehicle 50 along the x-axis of the vehicle. The system 10 also includes an y-axis accelerometer 74 for sensing acceleration of the vehicle 50 along the y-axis of the vehicle. The system 10 further includes a z-axis accelerometer 76 for sensing acceleration of the vehicle 50 along the z-axis of the vehicle. The accelerometers 72, 74 and 76 each are operatively connected to the ECU 70 to provide a signal indicative of sensed vehicle acceleration information to the ECU.

The accelerometers 72, 74 and 76 may be of any known construction, such as a capacitive accelerometer. Also, the accelerometers 72, 74, and 76 each may comprise redundant (e.g., double or triple redundant) accelerometers. Furthermore, in the example embodiment, the accelerometers 72, 74 and 76 are illustrated as being separate accelerometers arranged to sense acceleration along a single axis. It will be appreciated, however, that these single axis accelerometers could be replaced with a single multiple axis accelerometer.

The ECU 70 may also be operatively connected to a vehicle data bus 80 to send data to and receive data from other vehicle systems (not shown) via the vehicle data bus. For example, the may receive vehicle speed data from a vehicle control module or tire rotation data from an antilock braking system. The ECU 70 may use the data received from the vehicle data bus 80 in order to help determine when to actuate the active suspension components 12 and/or the vehicle occupant protection devices 14.

The ECU 70 may also be operatively connected other sensors 82 for providing information to the ECU 70. For example, the sensor 82 may provide data to the ECU 70 indicative of the steering angle of the vehicle 50. The ECU 70 may thus predict vehicle roll based on the steering angle provided by the sensor 82 and vehicle speed information provided via the vehicle data bus 80.

During operation of the vehicle, the accelerometers 72, 74 and 76 are operative to sense acceleration of the vehicle 50 and provide a signal to the ECU 70 indicative of the sensed vehicle acceleration. The signals are indicative of the magnitude and direction of the sensed vehicle acceleration. For example, a signal provided by any of the accelerometers 72, 74 and 76 may indicate acceleration in a first direction along a respective axis as a positive acceleration, and may indicate acceleration in a second direction, opposite the first direction, as a negative acceleration.

The ECU 70 is operative to receive the signals from the accelerometers 72, 74 and 76 and control the active suspension components 12 and the vehicle occupant protection devices 14 based on the signals received from the accelerometers. The accelerometers 72, 74 and 76 are the only accelerometers that provide acceleration data to the ECU 70. The system 10 is free from any other accelerometers for providing acceleration data to the ECU 70.

In controlling the active suspension components 12, the ECU 70 monitors vehicle roll, as indicated by vehicle acceleration along the y-axis and z-axis, and vehicle pitch, as indicated by vehicle acceleration along the x-axis and z-axis. Based on the signals provided by the accelerometers 72, 74 and 76, the ECU 70 determines which of the active suspension components, and the magnitude or force at which to actuate the components, in order to help counteract or negate the vehicle roll and/or pitch. The ECU 70 demands actuation of the active suspension components based on this determination. With respect to the active suspension components 12, the system 10 may comprise a closed-loop control circuit wherein the ECU 70 receives feedback from the active suspension components. Alternatively, with respect to the active suspension components 12, the system 10 may comprise an open-loop control circuit wherein the ECU 70 does not receive feedback from the active suspension components.

If vehicle roll is detected, the ECU 70 determines the magnitude and direction of the vehicle roll based on the acceleration information provided by the y-axis and z-axis accelerometers 74 and 76. Based on this determination, the ECU 70 determines which of the active suspension components 12 to actuate, and the magnitude at which to actuate the components, in order to help counteract vehicle roll. The ECU 70 demands actuation of the appropriate active suspension components at the appropriate magnitude in accordance with the determined requirements.

If vehicle pitch is detected, the ECU 70 determines the magnitude and direction of the vehicle roll based on the acceleration information provided by the x-axis and z-axis accelerometers 72 and 76. Based on this determination, the ECU 70 determines which of the active suspension components 12 to actuate, and the magnitude at which to actuate the components, in order to help counteract vehicle pitch. The ECU 70 demands actuation of the appropriate active suspension components at the appropriate magnitude in accordance with the determined requirements.

Although vehicle roll and pitch events have been described above separately, it should be recognized that vehicle roll and pitch are not mutually exclusive phenomena, i.e., both may occur simultaneously. For example, vehicle braking and cornering may occur simultaneously and thus cause vehicle pitch and roll simultaneously. Therefore, it will be appreciated that the system 10 is operable to help counteract the effects of vehicle roll and pitch simultaneously in the manner described above.

In controlling the vehicle occupant protection devices 14, the ECU 70 monitors vehicle acceleration along the x, y and z axes as indicated by the accelerometers 72, 74 and 76, respectively. Based on the signals provided by the accelerometers 72, 74 and 76, the ECU 70 monitors for the occurrence of a vehicle impact or rollover event. This determination is made by determining if any of the accelerometers 72, 74 and 76 sense a vehicle acceleration at or above a predetermined level.

If the vehicle 50 experiences a predetermined amount of acceleration along the x-axis of the vehicle, a front-end or rear-end vehicle impact is determined, depending on the direction of the acceleration. If the vehicle 50 experiences a predetermined amount of acceleration along the y-axis of the vehicle, a vehicle side impact is determined. If the vehicle 50 experiences a predetermined amount of acceleration along the z-axis, a vehicle rollover event is determined.

The ECU 70 is operable to actuate the vehicle occupant protection devices 14 in accordance with the determined vehicle events. The ECU 70 may actuate all of the vehicle occupant protection devices 14, or any combination thereof, depending on the nature of the determined vehicle event. For example, in the event of a front-end impact, rear-end impact, side impact or vehicle rollover event, the ECU 70 may actuate the seat belt tensioners 40 and the seat belt retractors 42. Also, in the event of a front-end or rear-end impact, the ECU 70 may actuate only the frontal air bags 30 and the knee bolsters 36. In the event of a side impact, the ECU 70 may actuate only the side impact air bags 32 and the inflatable side curtains 34. Finally, in the event of a vehicle rollover event, the ECU 70 may actuate all of the inflatable devices.

Although vehicle events have been described above separately, it should be recognized that the events are not mutually exclusive phenomena, i.e., any may occur simultaneously or nearly simultaneously. For example, is in a vehicle collision wherein the vehicle 50 experiences an impact at an angle, a combination such as a front-end and side impact may be determined and the ECU may actuate the vehicle occupant protection devices 14 accordingly. As another example, a vehicle side impact could result in a vehicle rollover event, in which case the ECU would actuate the vehicle occupant protection devices 14 accordingly. Thus, it will be appreciated that the system 10 is operable to determine multiple simultaneous or nearly simultaneous vehicle events and actuate the vehicle occupant protection devices 14 in response to the determined events.

The system 10 is thus operable to control the active suspension components 12 and the vehicle occupant protection devices 14 of the vehicle 50 via a single common ECU 70 connected to common accelerometers 72, 74 and 76. The system 10 is free from any other controllers and/or accelerometers for controlling the active suspension components 12 and/or the vehicle occupant protection devices 14.

The ECU 70 controls the active suspension components 12 and the vehicle occupant protection devices 14 based on the signals provides by the accelerometers 72, 74 and 76. In other words, the same signals are used to control both the active suspension components 12 and the vehicle occupant protection devices 14. There are no other accelerometers and, thus, no other acceleration signals dedicated to controlling the active suspension components 12 or the vehicle occupant protection devices 14 on an individual basis.

Advantageously, the system 10 eliminates the need to include separate dedicated controllers and/or separate dedicated accelerometers for controlling the active suspension components 12 and the vehicle occupant protection devices 14, respectively. This may help to reduce manufacturing time and costs, material costs, installation time and costs, etc.

Figure 3:
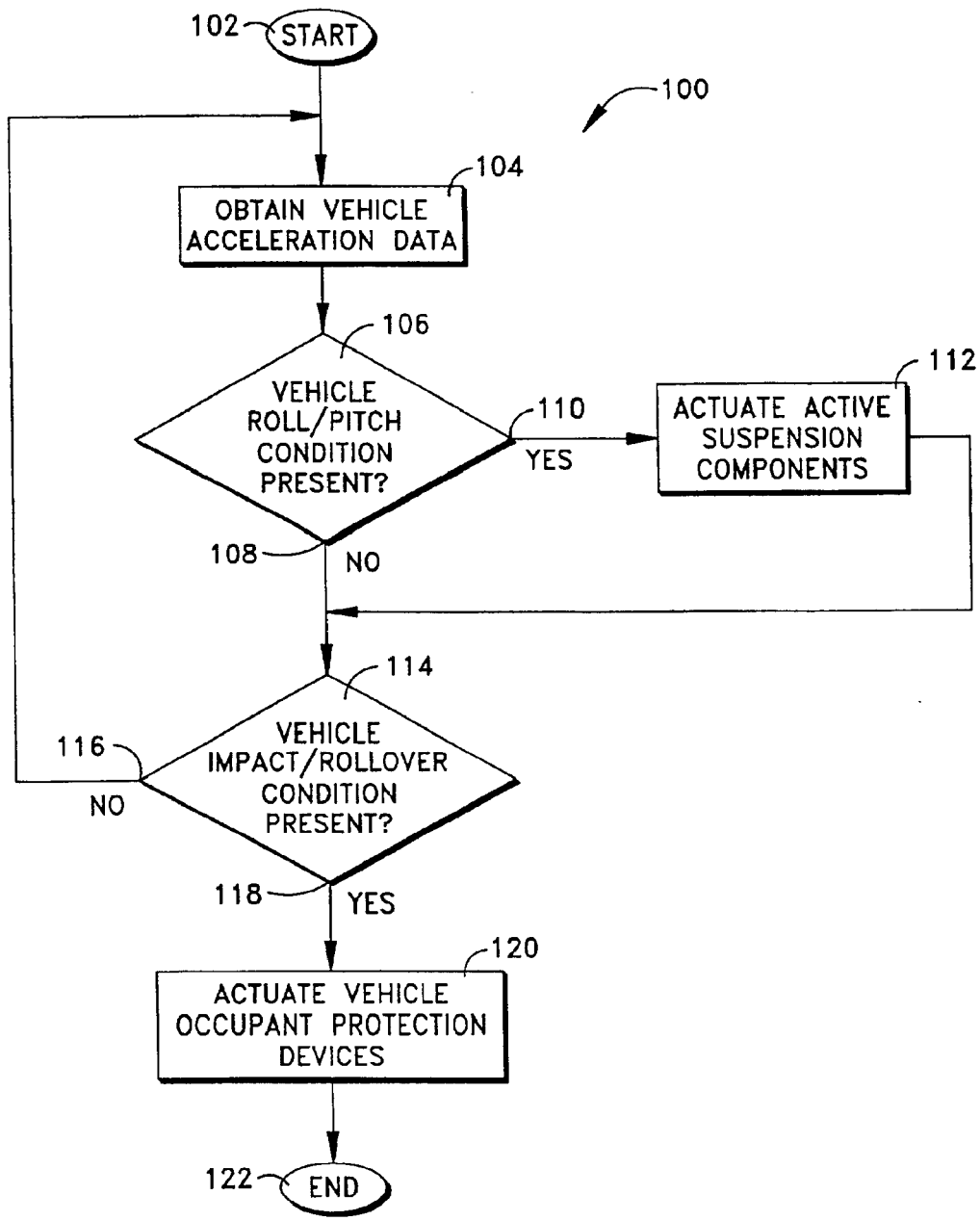
FIGS. 3 and 4 are flow charts illustrative of a process performed by the system of FIG. 1.

It will be appreciated that the system 10 performs a process for controlling the active vehicle suspension components 12 and the vehicle occupant protection devices 14. The method by which this process 100 is performed is illustrated in FIG. 3.

At step 102, the process 100 begins. At step 104, the ECU 70 obtains vehicle acceleration data from the accelerometers 72, 74 and 76. At step 106, the ECU 70 determines whether a vehicle roll and/or pitch condition exists based on the vehicle acceleration data obtained at step 104. If a vehicle roll and/or pitch condition is not determined, as indicated at 108, the process 100 proceeds to step 114. If a vehicle roll and/or pitch condition is determined, as indicated at 110, the process 100 proceeds to step 112, wherein the active suspension components 12 are actuated. The process 100 then proceeds to step 114.

At step 114, the ECU 70 determines whether a vehicle impact and/or rollover condition exists based on the vehicle acceleration data obtained at step 104. If a vehicle impact and/or rollover condition is not determined, as indicated at 116, the process 100 skips back to step 104 and obtains new vehicle acceleration data. If a vehicle impact and/or rollover condition is determined, as indicated at 118, the process 100 proceeds to step 120, wherein vehicle occupant protection devices 14 are actuated. The process 100 then proceeds to the end of the process, step 122.

Figure 4:
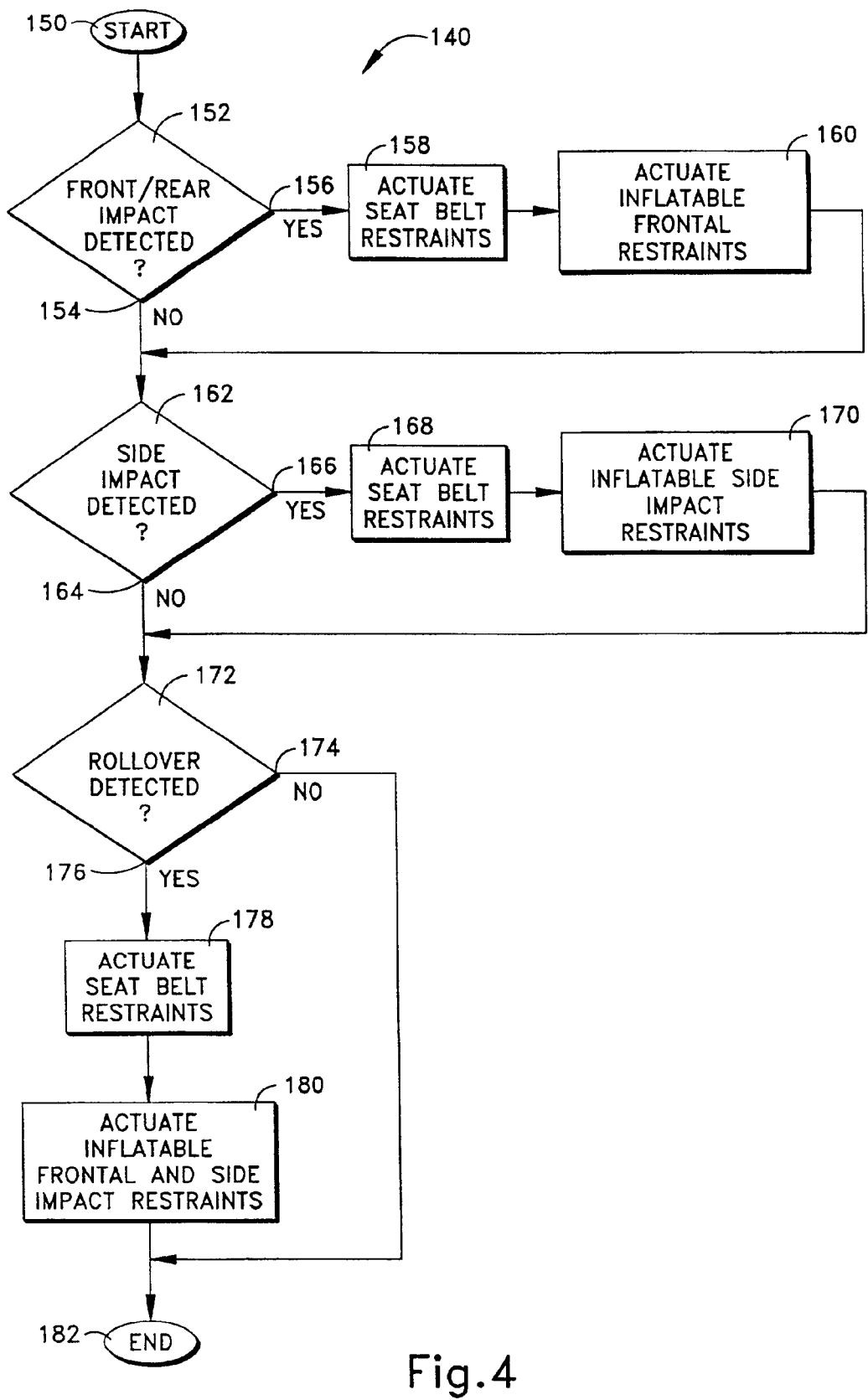

The vehicle occupant protection devices 14 actuated by the ECU 70 may be selected according to the specific type of impact and/or rollover condition detected at step 108. Therefore, during step 120, the ECU 70 may perform a process in which the vehicle occupant protection devices 14 are selected. The method by which the process 140 of step 120 is carried out is illustrated in FIG. 4.

At step 150, the process 140 begins. At step 152, the ECU 70 determines whether a front and/or rear impact is detected. If a front and/or rear impact is not determined, as indicated at 154, the process 140 proceeds to step 162. If a front and/or rear impact is determined, as indicated at 156, the process 140 proceeds to step 158, wherein the seat belt restraints are actuated, and to step 160, wherein the inflatable frontal restraints are actuated. The process 140 then proceeds to step 162.

At step 162, the ECU 70 determines whether a side impact is detected. If a side impact is not determined, as indicated at 164, the process 140 proceed to step 172. If a side impact is determined, as indicated at 166, the process 140 proceeds to step 168, wherein the seat belt restraints are actuated, and to step 170, wherein the inflatable side impact restraints are actuated. The process 140 then proceeds to step 172.

At step 172, the ECU 70 determines whether a rollover condition is detected. If a rollover condition is not determined, as indicated at 174, the process 140 proceed to step 182. If a rollover condition is determined, as indicated at 176, the process 140 proceeds to step 178, wherein the seat belt restraints are actuated, and to step 180, wherein the inflatable frontal and side impact restraints are actuated. The process 140 then proceeds to step 182. The process 140 ends at step 182.

From the above description of the invention, those skilled in the art will perceive improvements, changes and modifications. Such improvements, changes and modifications within the skill of the art are intended to be covered by the appended claims.

Having described the invention, the following is claimed:

1. A system for controlling an active suspension component of a vehicle and a vehicle occupant protection device of the vehicle, said system comprising:

a single controller, said single controller being controllably connected to at least one active suspension component of a vehicle and controllably connected to at least one vehicle occupant protection device of the vehicle; and at least one sensor for sensing acceleration of the vehicle along at least one axis of the vehicle, said at least one sensor being operatively connected to said single controller to provide at least one signal indicative of vehicle acceleration along the at least one axis to said controller, said single controller being operative to control at least one active suspension component in response to said at least one signal, said single controller also being operative to control the at least one vehicle occupant protection device in response to said at least one signal.

2. The system as defined in claim 1, wherein said at least one sensor comprises at least one accelerometer.

3. The system as defined in claim 2, wherein the at least one axis comprises one of an x-axis of the vehicle, a y-axis of the vehicle and a z-axis of the vehicle.

4. The system as defined in claim 2, wherein said at least one accelerometer comprises a first accelerometer for sensing acceleration of the vehicle along the x-axis, a second accelerometer for sensing acceleration of the vehicle along the y-axis, and a third accelerometer for sensing acceleration of the vehicle along the z-axis.

5. The system as defined in claim 4, wherein said system is free from any other accelerometers that are operative to provide a signal for controlling the at least one active suspension component and the at least one vehicle occupant protection device.

6. The system as defined in claim 4, further comprising a redundant accelerometer for each of said first, second and third accelerometers.

7. The system as defined in claim 2, wherein said at least one accelerometer comprises a multiple axis accelerometer.

8. The system as defined in claim 1, wherein said single controller comprises an electronic controller.

9. The system as defined in claim 1, wherein said single controller is a single electronic controller operative to control the at least one active suspension component and the at least one vehicle occupant protection device, said system being free from any other controllers for controlling the at least one active suspension component and the at least one vehicle occupant protection device.

10. The system as defined in claim 1, wherein the at least one vehicle occupant protection device comprises an inflatable vehicle occupant protection device.

11. The system as defined in claim 10, wherein the inflatable vehicle occupant protection device comprises at least one of a front impact air bag inflatable between a vehicle occupant and a dash of the vehicle, a side impact air bag inflatable between a vehicle occupant and a side structure of the vehicle, an inflatable curtain inflatable away from a roof of the vehicle into a position between a vehicle occupant and a side structure of the vehicle, and an inflatable knee bolster inflatable into a position between legs of a vehicle occupant and a dash of the vehicle.

12. The system as defined in claim 1, wherein the at least one vehicle occupant protection device comprises a seat belt retractor.

13. A system for controlling an active suspension component of a vehicle and a vehicle occupant protection device of the vehicle, said system comprising:
a single electronic controller, said single electronic controller being controllably connected to at least one active suspension component of a vehicle and controllably connected to at least one vehicle occupant protection device of the vehicle; and
at least one accelerometer for sensing acceleration of the vehicle along an x-axis, a y-axis and a z-axis of the vehicle, said at least one accelerometer being operatively connected to said single electronic controller to provide at least one signal indicative of vehicle acceleration along the x-axis, y-axis and z-axis to said single electronic controller, said single electronic controller being operative to control the at least one active suspension component in response to said at least one signal, said single electronic controller also being operative to control the at least one vehicle occupant protection device in response to said at least one signal, said system being free from any other controllers for controlling the at least one active suspension component of a vehicle and the at least one occupant protection device of the vehicle.

14. The system as defined in claim 13, wherein said at least one accelerometer comprises a first accelerometer for sensing acceleration of the vehicle along the x-axis, a second accelerometer for sensing acceleration of the vehicle along the y-axis, and a third accelerometer for sensing acceleration of the vehicle along the z-axis.

15. A method for controlling an active suspension component of a vehicle and a vehicle occupant protection device of the vehicle, said method comprising the steps of:
providing a controller, said controller being operatively connected to at least one active suspension component of a vehicle and at least one vehicle occupant protection device of the vehicle;
providing at least one sensor for sensing acceleration of the vehicle along at least one axis of the vehicle, said at least one sensor being operatively connected to said controller to provide a signal indicative of vehicle acceleration along the at least one axis to said controller, said controller performing the steps of:
obtaining said signal from said means for sensing;
determining whether a vehicle roll condition exists and actuating the at least one active suspension component in response to the roll condition;
determining whether a vehicle pitch condition exists and actuating the at least one active suspension component in response to the pitch condition;
determining whether a vehicle impact condition exists and actuating the at least one vehicle occupant protection device in response to the vehicle impact condition; and
determining whether a vehicle rollover condition exists and actuating the at least one vehicle occupant protection device in response to the vehicle rollover condition.

16. The method as defined in claim 15, wherein said step of determining whether a vehicle impact condition exists and actuating the at least one vehicle occupant protection device in response to a determined vehicle impact condition comprises the steps of:
determining whether a front impact condition exists and actuating a seat belt restraint and inflatable frontal restraints in response to the front impact condition;
determining whether a rear impact condition exists and actuating a seat belt restraint and inflatable frontal restraints in response to the rear impact condition; and
determining whether a side impact condition exists and actuating a seat belt restraint and inflatable side impact restraints in response to the side impact condition.

17. The method as defined in claim 15, wherein said step of determining whether a vehicle rollover condition exists and actuating the at least one vehicle occupant protection device in response to a determined vehicle rollover condition further comprises the steps of:
determining whether a vehicle rollover condition exists; and
actuating a seat belt restraint, inflatable frontal restraints and inflatable side impact restraints in response to the rollover condition.

18. The method as defined in claim 15, wherein said step of providing at least one sensor comprises the steps of:
providing a first sensor for sensing vehicle acceleration along an x-axis of the vehicle;
providing a second sensor for sensing vehicle acceleration along a y-axis of the vehicle; and
providing a third sensor for sensing vehicle acceleration along a z-axis of the vehicle.

* * * * *